United States Patent
Volanthen et al.

(10) Patent No.: US 8,759,744 B2
(45) Date of Patent: Jun. 24, 2014

(54) APPARATUS AND METHOD FOR OPERATING A SPECTROMETER

(75) Inventors: Mark Volanthen, Romsey (GB); Glynn Lloyd, Birmingham (GB)

(73) Assignee: Moog Insensys Limited, Fareham, Hampshire (GB)

( * ) Notice: Subject to any disclaimer, the term of this patent is extended or adjusted under 35 U.S.C. 154(b) by 478 days.

(21) Appl. No.: 13/123,950

(22) PCT Filed: Oct. 14, 2009

(86) PCT No.: PCT/GB2009/051365
§ 371 (c)(1), (2), (4) Date: Jul. 11, 2011

(87) PCT Pub. No.: WO2010/043895
PCT Pub. Date: Apr. 22, 2010

(65) Prior Publication Data
US 2011/0261358 A1    Oct. 27, 2011

(30) Foreign Application Priority Data
Oct. 14, 2008  (GB) .................. 0818819.5

(51) Int. Cl.
*G01J 3/46* (2006.01)
(52) U.S. Cl.
USPC ................... 250/227.18; 250/227.23; 385/10; 356/328
(58) Field of Classification Search
USPC ............. 250/227.11, 227.16, 227.18, 227.23, 250/226; 356/319, 326, 328, 451, 477
See application file for complete search history.

(56) References Cited

U.S. PATENT DOCUMENTS

| 5,305,233 | A | 4/1994 | Kawagoe |
| 6,233,373 | B1 * | 5/2001 | Askins et al. .................. 385/12 |
| 6,967,718 | B1 | 11/2005 | Carlisle |
| 2004/0046109 | A1 | 3/2004 | Chen |
| 2005/0205758 | A1 | 9/2005 | Almeida |

FOREIGN PATENT DOCUMENTS

WO    99/09370    2/1999

OTHER PUBLICATIONS

International Search Report for corresponding patent application No. PCT/GB2009/051365 dated Jan. 7, 2010.

* cited by examiner

*Primary Examiner* — Kevin Pyo
(74) *Attorney, Agent, or Firm* — Renner, Otto, Boisselle & Sklar, LLP

(57) ABSTRACT

A method of operating a spectrometer to determine the wavelength of an optical signal, in particular for determining the resonant wavelength of an optical fiber Bragg grating. The spectrometer comprises an array of photosensitive pixels each of which generates an output signal in response to the intensity of light incident on the pixel, and a refractive element arranged to direct light to a particular position in the array depending on the wavelength of the light. The method involves selecting a first group of pixels in the array by reference to an expected wavelength distribution of the optical signal and monitoring the output signals from the first group of pixels. On the basis of the output signals from the first group of pixels a second group of pixels is selected and the wavelength of the optical signal is determined from the output signals of the second group of pixels. The method has the advantage that the wavelength of the optical signal can be determined without scanning every pixel in the array individually.

14 Claims, 3 Drawing Sheets

US 8,759,744 B2

APPARATUS AND METHOD FOR OPERATING A SPECTROMETER

This application is a national phase of International Application No. PCT/GB2009/051365 filed 14 Oct. 2009 and published in the English language.

FIELD OF THE INVENTION

This invention relates to apparatus and a method for operating a spectrometer to determine the wavelength of an optical signal, in particular for determining the resonant wavelength of an optical fibre Bragg grating.

BACKGROUND TO THE INVENTION

A typical spectrometer comprises an array of photosensitive pixels (photodiodes) each of which generates an output signal in response to the intensity of light incident on the pixel, and a refractive element arranged to direct light to a particular position in the array depending on the wavelength of the light.

Various known readout configurations are shown in FIGS. 1 to 3. FIG. 1 shows a plurality of photosensitive diodes each connected to a common integrator via a multiplexer. The integrator is connected to a common analogue to digital converter. During operation, each photosensitive diode, or pixel, is captured and read out in turn. This system captures and reads each pixel in turn and therefore takes a relatively long time. FIG. 2 shows an alternative system wherein the photosensitive diodes are each connected to a respective integrator, and the integrators are connected to a common analogue to digital converter via a multiplexer. The photosensitive diodes are read in parallel, thus speeding up the reading process. However, the analogue to digital converter can only read the integrator signals one at a time. Therefore, the system is rate-limited by the speed with which the analogue to digital converter is able to process the signals from the integrators. This tends to be relatively slow. FIG. 3 shows a further prior art system wherein the photosensitive diodes are connected to individual integrators, which are in turn each connected to respective individual analogue to digital converters. The system runs quicker than the other systems shown in FIGS. 1 and 2 as the signals from the photosensitive diodes are processed in parallel by the integrators and the analogue to digital convertors also run in parallel. However, the system is expensive to manufacture and requires large amounts of power to operate.

The present invention, at least in its preferred embodiment, seeks to obviate one or more of these disadvantages of known spectrometer reading systems.

SUMMARY OF THE INVENTION

Accordingly, the invention is directed to a method of operating a spectrometer to determine the wavelength of an optical signal, in particular for determining the resonant wavelength of an optical fibre Bragg grating. The spectrometer comprises an array of photosensitive pixels each of which generates an output signal in response to the intensity of light incident on the pixel, and a refractive element arranged to direct light to a particular position in the array depending on the wavelength of the light. The method comprises selecting a first group of pixels in the array by reference to an expected wavelength distribution of the optical signal, monitoring the output signals from the first group of pixels, on the basis of the output signals from the first group of pixels, selecting a second group of pixels, and determining the wavelength of the optical signal from the output signals of the second group of pixels.

Thus, according to the invention, it is unnecessary to read all of the pixels to determine the wavelength of the optical signal. A first group of pixels can be read to provide a broad indication of the wavelength of the signal, followed by a second group of pixels that can accurately identify the wavelength. By using information about the expected wavelength and wavelength distribution of the optical signal, the number of pixels that need to be read can be reduced thereby speeding up the processing time to identify the wavelength of the optical signal.

The first group of pixels may be selected by reference to the expected bandwidth of the optical signal. In this case, for example, it may be known that optical signal will generally impinge upon three pixels of the array. Thus, by reading only every third pixel (the first group), the location of the optical signal in the array can be broadly identified and three pixels (second group) around the pixel in the first group that has a non-zero output can be used to identify accurately the wavelength of the optical signal. The second group of pixels may therefore include at least one pixel from the first group of pixels.

Thus, the pixels of the first group may be interleaved in the array with pixels that are not members of the first group. The wavelength range occupied by non-member pixels between pixels that are members of the first group may be less than the expected bandwidth of the optical signal.

The method may comprise selecting a plurality of first groups of pixels in the array by reference to an expected wavelength distribution of the optical signal. Within each first group the output signals from all the pixels in the group may be summed to generate a group output signal. The second group of pixels may be selected on the basis of the group output signals. In this case, the entire array may be split into first groups of pixels, with only one (summed) output for the group. In this way, any group with a non-zero output will indicate that the wavelength of the optical signal lies within that group. The second groups of pixels can then be selected as the members pixels of the so identified first group(s) in order and the individual outputs of those pixels read out to identify accurately the wavelength of the signal. Thus, the second group of pixels may consist of pixels from those first groups having a group output signal above a predetermined threshold.

The first group of pixels may be selected by reference to a preceding determination of the wavelength of the optical signal. In other words, the historic wavelength of the optical signal may be used to predict the future wavelength. The first group of pixels may comprise the second group of pixels from a preceding determination of the wavelength of the optical signal. In other words, the last measurement of the wavelength may be used as the starting point for identifying the next measurement of the wavelength. This is useful where it is known that the signal changes wavelength only slowly. The first group of pixels may further comprise pixels neighbouring the second group of pixels from a preceding determination of the wavelength of the optical signal. In this case, the group of pixels in which it is expected to identify the wavelength of the optical signal can be extended beyond the group of pixels used to identify the preceding wavelength measurement. The number of neighbouring pixels in the first group of pixels may be selected by reference to an expected rate of change of wavelength of the optical signal.

In general the pixels of the second group are consecutive pixels of the array occupying a wavelength range corresponding substantially to the expected bandwidth of the optical signal. The output signals of the second group of pixels may be interpolated to determine the wavelength of the optical signal. This can provide resolution greater than the resolution of individual pixels.

The invention extends to spectrometer apparatus configured to operate in accordance with the method of any preceding claim. The apparatus for reading a spectrometer may comprise a plurality of photosensitive diodes, at least one integrator and at least one analogue to digital converter. The photosensitive diodes may form the input to a switch matrix and the integrator(s) may be connected to the at least one analogue to digital converter to form the output of the switch matrix, such that at least some of the photosensitive diodes can be connected to the output of the switch matrix. Preferably, the switches of the switch matrix are field effect transistors.

BRIEF DESCRIPTION OF THE DRAWINGS

An embodiment of the invention will now be described, by way of example only, and with reference to the accompanying drawings, in which:

FIG. 9 is a diagrammatic view of apparatus for reading a spectrometer comprising a comparator arrangement; and FIG. 10 is a schematic drawing of a circuit for use the apparatus of FIG. 9.

DETAILED DESCRIPTION OF EXEMPLARY EMBODIMENTS

Figure 4:
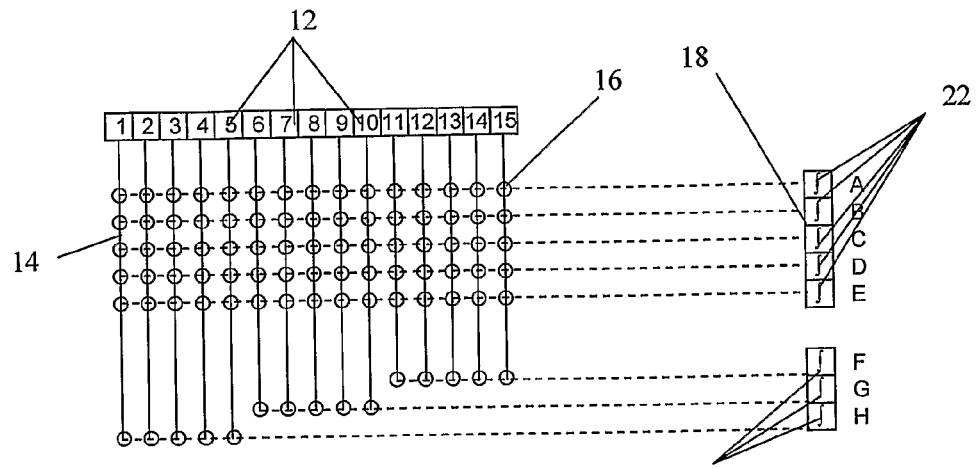
FIG. 4 is a diagrammatic view of apparatus for reading a spectrometer in accordance with the present invention.

FIG. 4 shows spectrometer reading apparatus 10 comprising a plurality of photosensitive diodes, or pixels, 12 connected as inputs to a switch matrix 14. The switches of the switch matrix 16 comprise field effect transistors. Integrators 18 are connected to the output of the matrix 14. The integrators 18 comprise group integrators 20 and individual integrators 22. The group integrators 20 are each connected to adjacent groups of five pixels 12. As shown in FIG. 4, several pixels 12 are routed to one group integrator 20 by closing multiple switches in the matrix 16. This sums the currents from each of the pixels 12 and routes them to a common group integrator 20. The individual integrators 22 are connected to the switch matrix 16 such that any pixel 12 maybe put in communication with any of the individual integrators 22. The switch matrix 14 is a non-blocking matrix with respect to the pixels 12 and the individual integrators 22.

The individual integrators 22 are connected to respective analogue to digital converters (not shown) or to a multiplexer which is in turn connected to a single analogue to digital converter (not shown).

Figure 5:
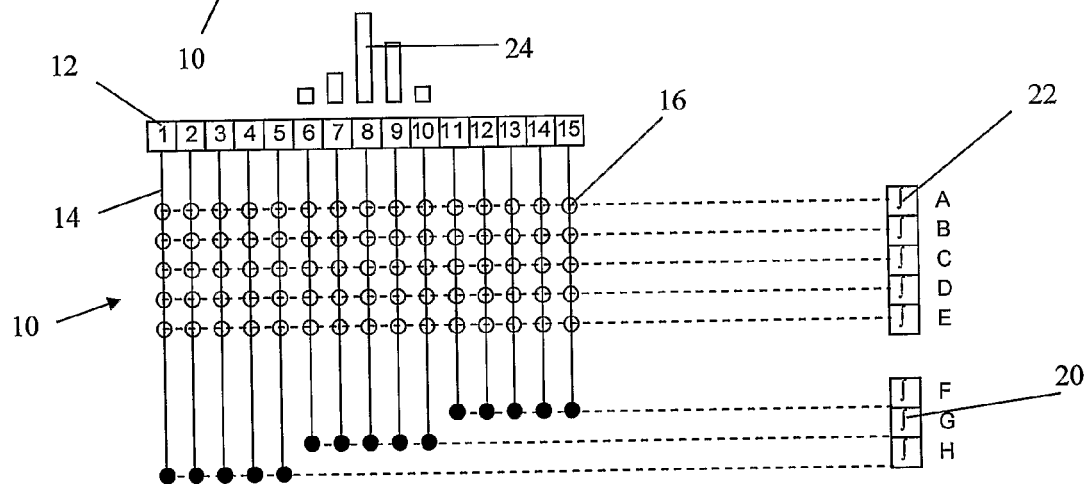
FIG. 5 is a diagrammatic view of the apparatus of FIG. 4, showing an optical signal and closed switches.
Figure 6:
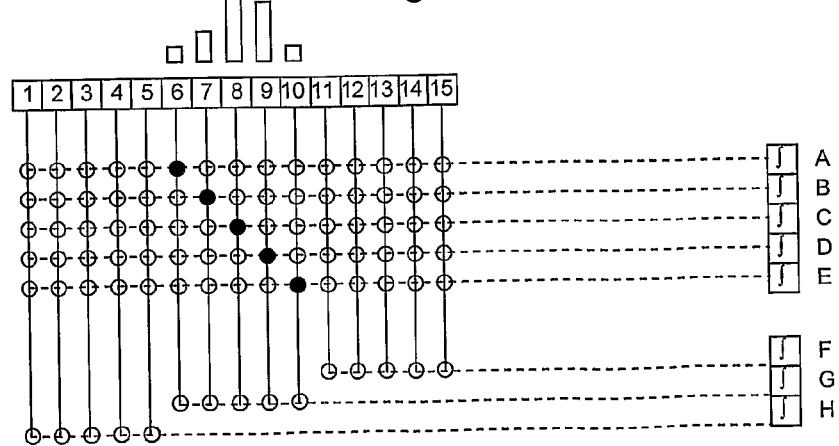
FIG. 6 is a diagrammatic view of the apparatus of FIG. 5, showing further closed switches.

As shown in FIGS. 5 and 6, when in operation, the groups of five pixels 12 are connected to each of the group integrators 20 by closing particular switches of the switch matrix 14; closed switches are shown in black in the Figures. Therefore, integrator H receives the summed current from pixels 1 to 5, integrator G receives the summed current from pixels 6 to 10 and integrator F receives the summed current from pixels 11 to 15.

An optical signal 24 is directed onto the pixels 12. The group integrators 20 receive a current from the groups of pixels 12 to which they are in communication via the switch matrix 14. From the current received by the group integrators 20, it is possible to determine where on the array of pixels 12 the optical signal 24 is incident. The approximate location of the optical signal 24 is determined in the time it takes to make three readings by using a single common analogue to digital converter (not shown) connected to the integrators 20, or one reading using respective analogue to digital converters (not shown), rather than the time it takes to read all of the pixels 12. It should be noted that the switching time of the switch matrix 14 is sufficiently quick to be regarded as negligible.

Once the approximate position of the optical signal 24 has been determined, the switch matrix is adjusted such that the pixels on which the optical signal 24 is located are put in communication with individual integrators 22, as shown in FIG. 6. The current levels of pixels 6 to 10 in FIG. 6 are now read through integrators A to E 22. The output from these integrators 22 is then analysed to establish the location of the peak of the optical signal 24.

The time taken to locate the optical signal 24 on the array of pixels 12 has thus taken the time to acquire eight readings (three during the group integrator phase, then five during the individual integrator phase), rather than fifteen readings as occurs in existing apparatus.

Figure 1:
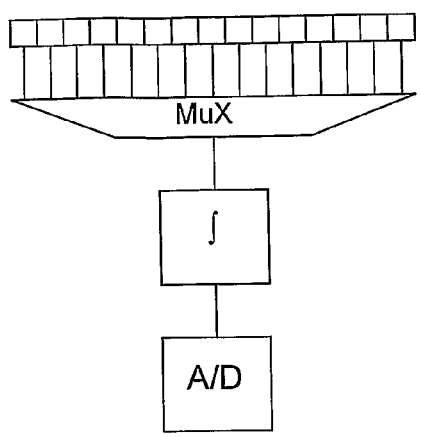
FIGS. 1 to 3 show apparatus for reading a spectrometer according to the prior art.
Figure 2:
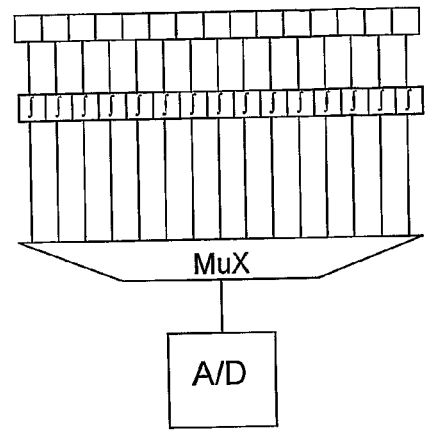
Figure 3:
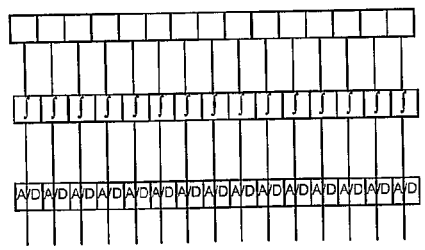

Alternatively, if the integrators 20 and 22 are connected to respective individual analogue to digital converters (not shown), the time taken to establish the location of the optical signal 24 on the pixel array 12 is the time to take two readings. Although this is double the time compared to connecting each pixel 12 to a respective individual analogue to digital converter via a respective individual integrator, only eight rather than fifteen analogue to digital converters are required. Therefore, the present invention requires the use of less power and reduces the cost of construction of the apparatus than the system shown in FIG. 3.

The benefit of the system of the present invention is more obvious in a one hundred pixel array, wherein only twenty-five integrators are required; twenty group integrators and five individual integrators.

Figure 7:
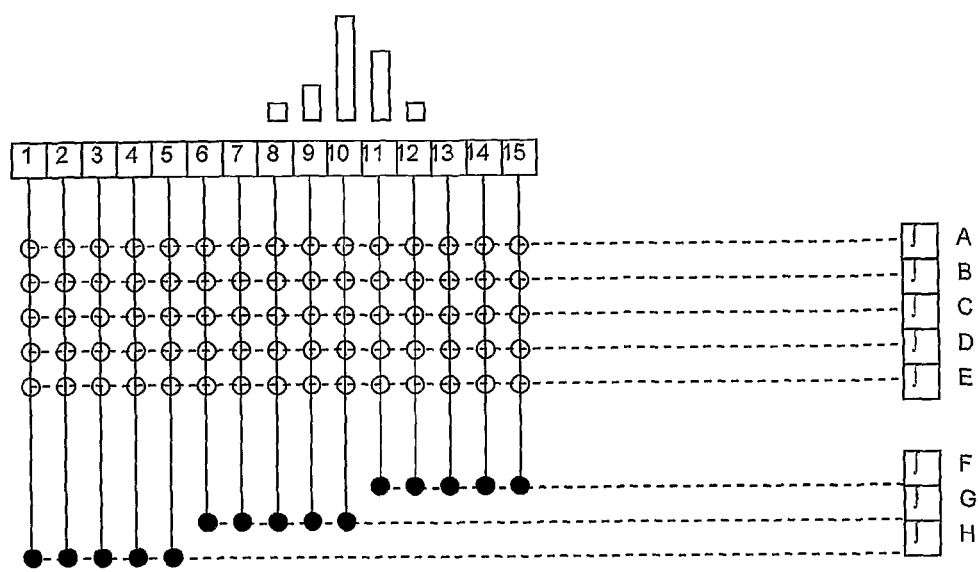
FIG. 7 is a diagrammatic view of the apparatus of FIG. 4, showing a second optical signal and closed switches.
Figure 8:
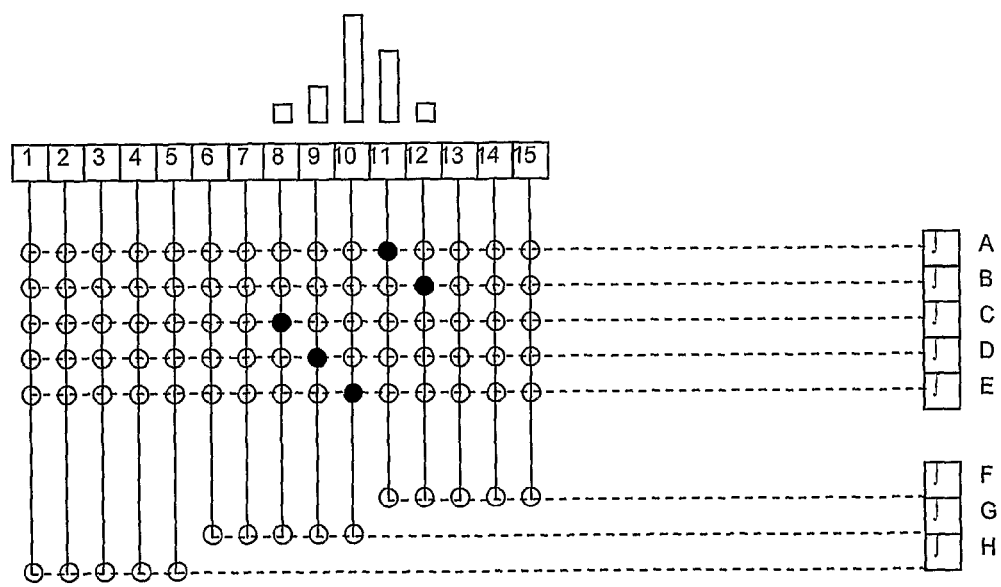
FIG. 8 is a diagrammatic view of the apparatus of FIG. 7, showing further closed switches.

FIG. 7 shows the same apparatus as shown in FIG. 6 in a situation where the optical signal 24 bridges two groups of five pixels 12. In such a situation the relative magnitudes of the group integrators 20 that cover the $8^{th}$ to $12^{th}$ pixels 12 is compared to establish in which group of pixels 12 the peak of the optical signal 24 is located. In FIG. 7, the relative magnitudes of group integrators F and G 20, would indicate that the peak is between the $8^{th}$ and the $12^{th}$ pixels 12. Once this is known the switch matrix connects the pixels 12 to the individual integrators 22, as shown in FIG. 8, wherein closed switches are indicated in black. The individual integrators 22 are then analysed to establish the actual location of the peak of the optical signal 24.

Alternatively, the apparatus may be provided with a comparator circuit 40 as shown in FIG. 9. Pixels 42 are connected to comparators 44, which are in turn connected to decoding electronics 46. An optical signal 48 is applied to at least some of the pixels 42. A reference level is applied to all of the comparators 44 at the same time. The reference level is increased incrementally until only the current from one pixel 42 exceeds the reference level. The one pixel 42 indicates the peak of the optical signal 48.

Alternatively, the reference level begins high and is incrementally decreased from an initial level above the optical signal 48 until the first pixel is detected.

It is possible to use the output of the pixels 12 themselves to generate a reference level for the comparator 44 and thus avoid any requirement of increasing or decreasing of the reference. FIG. 10 shows a circuit 60 for such a situation. Whilst the output of the photodiodes of the spectrometer is a current, the concept will be described in relation to voltage. In FIG. 10, the diodes 62, 64, 66, 68 and 70 drop 0.7 volts when they are forward biased. The highest voltage diode 66 generates a voltage of 7.3 volts at the output. All of the other diodes, 62, 64, 68 and 70 are therefore reversed biased and the output voltage of those diodes is therefore always 0.7 volts less than the maximum voltage. Just under 0.7 volts can be added back to the voltage to generate the reference signal for the comparator, for example by using an operational amplifier with a feedback diode.

It is possible that two pixels will exceed the reference. This can be dealt with either by using the circuit shown in FIG. 10 and sweeping the reference up until only one pixel remains above the reference level, or use either of the two pixels as the central pixel and measure the optical signal about that pixel.

Although the illustrated embodiment refers to groups of five pixels 12 connected to the group integrators 20, it will be appreciated that the number of pixels 12 connected to the group integrators 20 is not necessarily limited to five and may be connected to any appropriate number of pixels 12.

The switches 16 of the switch matrix 14 may comprise other suitable switches and may not be field effect transistors. Furthermore, whilst the invention is described in terms of connecting multiple pixels 12 to a single integrator 20, 22, due to the nature of the switch matrix, it is also possible to connect a single pixel 12 to multiple integrators 20, 22.

Numerous other variations and modifications to the illustrated constructions may occur to the reader familiar with the art without taking the device outside the scope of the present invention. For example, all of the pixels may be connectable to all of the integrators via the switch matrix.

In summary, there is disclosed herein a method of operating a spectrometer to determine the wavelength of an optical signal, in particular for determining the resonant wavelength of an optical fibre Bragg grating. The spectrometer comprises an array of photosensitive pixels each of which generates an output signal in response to the intensity of light incident on the pixel, and a refractive element arranged to direct light to a particular position in the array depending on the wavelength of the light. The method involves selecting a first group of pixels in the array by reference to an expected wavelength distribution of the optical signal and monitoring the output signals from the first group of pixels. On the basis of the output signals from the first group of pixels a second group of pixels is selected and the wavelength of the optical signal is determined from the output signals of the second group of pixels. The method has the advantage that the wavelength of the optical signal can be determined without scanning every pixel in the array individually.

The invention claimed is:

1. A method of operating a spectrometer to determine the wavelength of an optical signal, for determining the resonant wavelength of an optical fibre Bragg grating, wherein the spectrometer comprises an array of photosensitive pixels each of which generates an output signal in response to the intensity of light incident on the pixel, the output signal being communicated to a switch matrix, and the output of the switch matrix being received by an integrator to determine the strength of the pixel output signal; and a refractive element arranged to direct light to a particular position in the array depending on the wavelength of the light, the method comprising:
selecting a first group of pixels in the array by reference to a wavelength distribution of the optical signal,
monitoring the output signals from the first group of pixels;
on the basis of the output signals from the first group of pixels, selecting a second group of pixels; and
determining the wavelength of the optical signal from the output signals of the second group of pixels.

2. A method as claimed in claim 1, wherein the first group of pixels is selected by reference to an expected bandwidth of the optical signal.

3. A method as claimed in claim 2, wherein the pixels of the first group are interleaved in the array with pixels that are not members of the first group and the wavelength range occupied by non-member pixels between pixels that are members of the first group is less than the expected bandwidth of the optical signal.

4. A method as claimed in claim 3, wherein the second group of pixels includes at least one pixel from the first group of pixels.

5. A method as claimed in claim 1, wherein the method comprises:
selecting a plurality of first groups of pixels in the array by reference to the wavelength distribution of the optical signal,
within each first group summing the output signals from all the pixels in the group to generate a group output signal, and
selecting the second group of pixels on the basis of the group output signals.

6. A method as claimed in claim 5, wherein the second group of pixels consists of pixels from those first groups having a group output signal above a predetermined threshold.

7. A method as claimed in claim 1, wherein the first group of pixels is selected by reference to a preceding determination of the wavelength of the optical signal.

8. A method as claimed in claim 7, wherein the first group of pixels comprises the second group of pixels from a preceding determination of the wavelength of the optical signal.

9. A method as claimed in claim 8, wherein the first group of pixels further comprises pixels neighbouring the second group of pixels from a preceding determination of the wavelength of the optical signal.

10. A method as claimed in claim 9, wherein the number of neighbouring pixels in the first group of pixels is selected by reference to an expected rate of change of wavelength of the optical signal.

11. A method as claimed in claim 1, wherein the pixels of the second group are consecutive pixels of the array occupying a wavelength range corresponding substantially to the expected bandwidth of the optical signal.

12. A method as claimed in claim 1, wherein the output signals of the second group of pixels are interpolated to determine the wavelength of the optical signal.

13. Spectrometer apparatus configured to operate in accordance with the method of claim 1.

14. A method according to claim 1, using a switch matrix that includes field-effect transistors.

* * * * *